United States Patent [19]
Okazaki et al.

[11] Patent Number: 5,901,426
[45] Date of Patent: May 11, 1999

[54] METHOD OF COMBINING WORKPIECES

[75] Inventors: Shigeru Okazaki; Yutaka Asano; Shinji Imai; Nobuya Takeishi; Isao Bundo, all of Saitama-ken, Japan

[73] Assignee: Honda Giken Kogyo Kabushiki Kaisha, Tokyo, Japan

[21] Appl. No.: 08/767,329

[22] Filed: Dec. 16, 1996

[30] Foreign Application Priority Data

| Dec. 28, 1995 | [JP] | Japan | 7-342366 |
| Dec. 28, 1995 | [JP] | Japan | 7-342403 |
| Dec. 28, 1995 | [JP] | Japan | 7-342422 |
| Dec. 28, 1995 | [JP] | Japan | 7-342436 |
| Dec. 28, 1995 | [JP] | Japan | 7-342458 |
| Dec. 28, 1996 | [JP] | Japan | 7-342394 |

[51] Int. Cl.$^6$ ................................................. B23Q 17/00
[52] U.S. Cl. ................................ 29/407.08; 29/407.05; 29/559; 269/329
[58] Field of Search ........................... 29/407.05, 559, 29/407.08; 269/329

[56] References Cited

U.S. PATENT DOCUMENTS 5,349,735  9/1994  Kawase et al. .................. 29/407.05
5,467,517  11/1995  Sugito et al. .................... 29/407.05

FOREIGN PATENT DOCUMENTS 1-153387  6/1989  Japan .
1134672  11/1968  United Kingdom .
1482271  8/1977  United Kingdom .

*Primary Examiner*—P. W. Echols
*Attorney, Agent, or Firm*—Armstrong, Westerman, Hattori, McLeland & Naughton

[57] ABSTRACT

Distortion amounts $\delta1$, $\delta2$, $\delta12$ of workpieces are measured. Based on these distortion amounts, those correction amounts $A1, A2, A3$ for correcting the workpieces which are required to eliminate the distortions after the workpieces have been combined are computed. Clamp units are moved to thereby deflect the workpieces by the correction amounts. In this state, the workpieces are combined.

17 Claims, 7 Drawing Sheets

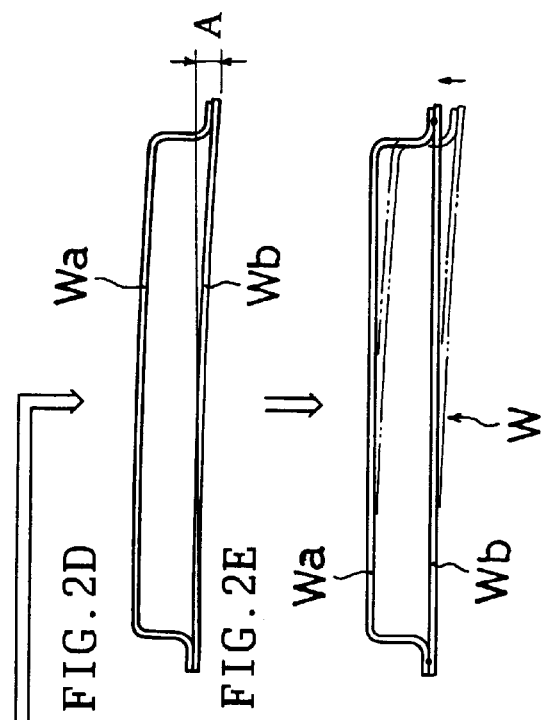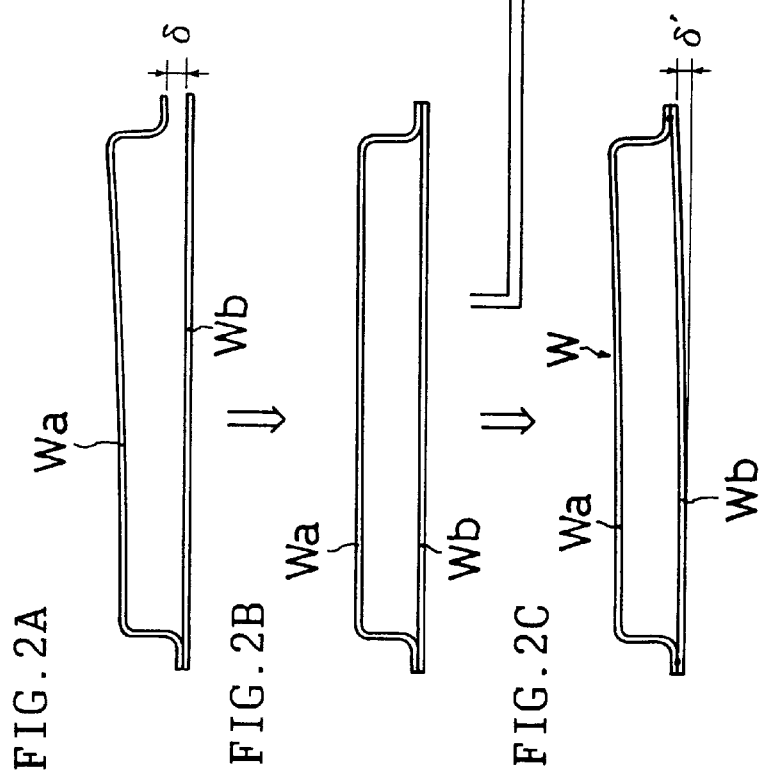

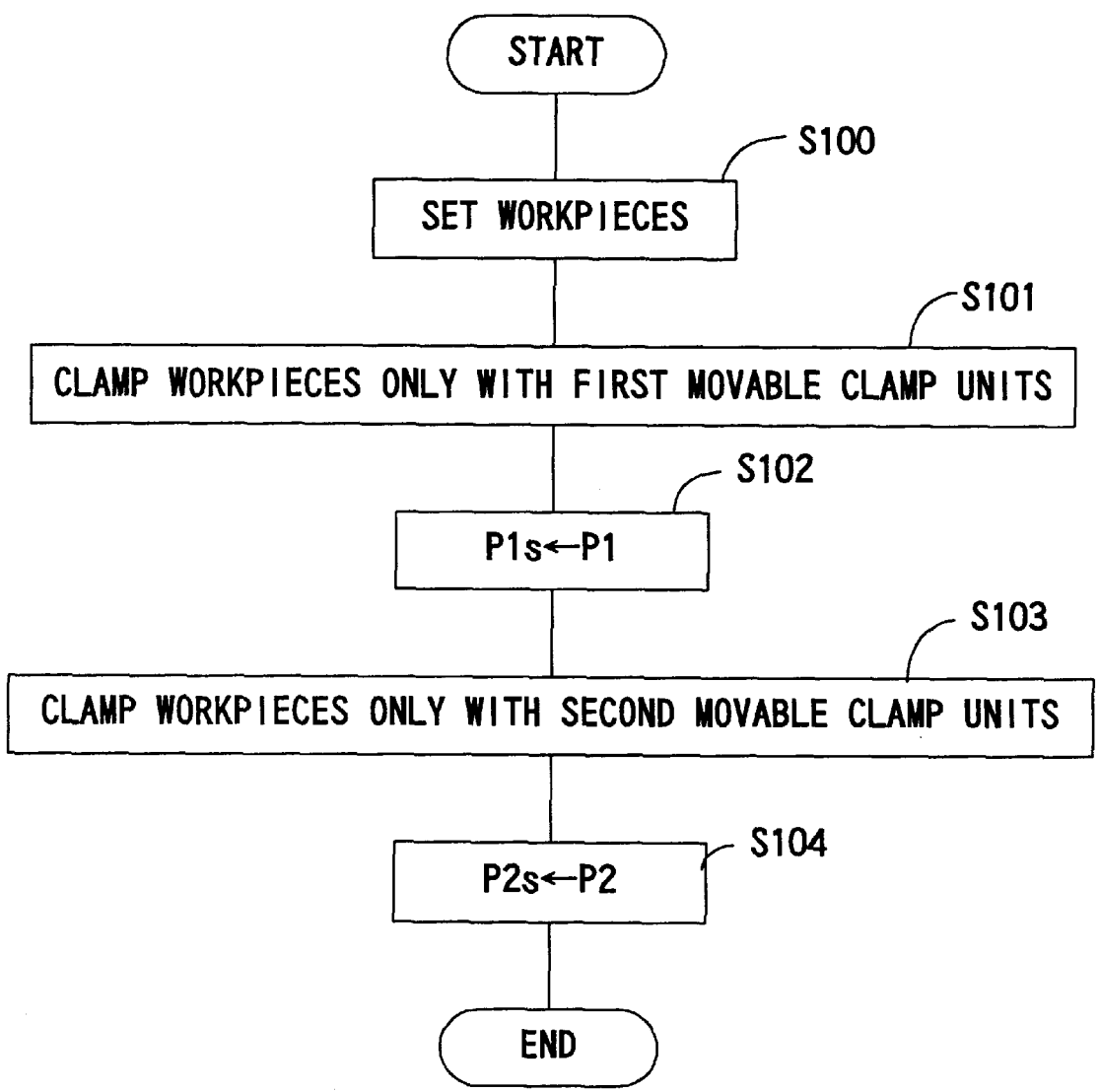

METHOD OF COMBINING WORKPIECES

BACKGROUND OF THE INVENTION

1. Field of the Invention

The present invention relates to a method of combining or joining workpieces in which two or more workpieces are set in position on a jig having mounted thereon clamp units and then these workpieces are combined while they are clamped by the clamp units.

2. Description of the Related Art

In Japanese Published Unexamined Patent Application No. 153387/1989, the following method is conventionally known. Namely, clamp units are arranged to be movable. In the first place, workpieces are combined by clamping them together in a condition or state in which the clamp units are positioned in predetermined reference positions to be determined by design data. Then, the accuracy of a product thus assembled by this combining work is optically measured. Based on the result of this measurement, the positions of the clamp units are corrected and the combining work and its accuracy measurement are performed with the next workpieces. These steps are repeated until a product having a desired accuracy can be obtained.

An example is now considered in which a product having a closed cross section is assembled by combining two workpieces Wa, Wb as shown in FIG. 1. For example, if the workpiece Wa has a distortion δ as shown in FIG. 2A, the workpiece Wa will be forcibly deflected by the amount of the distortion δ as shown in FIG. 2B at the time of clamping. If the product W is assembled by combining the workpieces in this state, the product W will give rise to a distortion δ' by springing back when it is unclamped as shown in FIG. 2C.

In the above-described conventional art, this kind of distortion δ' in the product is measured, and the positions of the clamp units are corrected in a direction to decrease the distortion, followed by the combining work of the next workpieces. In this kind of feedback system of correction, however, it is impossible to obtain a product of higher accuracy from the very beginning, with the result that much waste occurs. Further, workpieces have an inherent dispersion of their own within the same lot in addition to a dispersion from lot to lot. In case the distortion of the workpieces of this time is different from the distortion of the workpieces of the last time, the correction based on the measured data of the product obtained by the combining the workpieces of the last time does not apply to the workpieces of this time any more. It follows that the conventional feedback system of correction cannot deal with the dispersions of the respective workpieces.

SUMMARY OF THE INVENTION

In view of the above points, the present invention has an object of providing a method of combining workpieces in which the product of higher accuracy can be obtained from the very beginning and in which the respective dispersions of the workpieces can be dealt with.

In order to solve the above-described problems, the present invention is a method of combining workpieces in which two or more workpieces are set in position on a jig having mounted thereon clamp units and the workpieces are combined while being clamped by the clamp units. The method comprises: a first step of measuring that deflection amount of the workpieces which occurs when the workpieces set on the jig are clamped by the clamp units; a second step of computing a distortion amount of the workpieces from the measured deflection amount; a third step of computing, based on the computed distortion amount, a correction amount of the workpieces required to eliminate a distortion after the workpieces have been combined; a fourth step of further deflecting the workpieces by the computed correction amount by moving the clamp units; and a fifth step of combining the workpieces while keeping the workpieces in a deflected state of the fourth step.

According to the present invention, the distortion of the workpieces which are set on the jig this time can be detected. Here, in case the workpieces with distortions are combined, the workpieces Wa, Wb are clamped to deflect the workpiece Wa by a distortion amount δ as shown in FIG. 2B. After clamping, the workpieces Wa, Wb are further deflected by a predetermined correction amount "A" as shown in FIG. 2D. If the workpieces are combined in this state, a product will spring back by the correction amount "A" as shown in FIG. 2E when they are unclamped, with the result that no distortion will remain in the product W.

Between this correction amount and the distortion amount of the workpieces, there can be established an unequivocal relationship as described hereinafter. Therefore, if the correction amount is computed based on the measured distortion amount to thereby combine the workpieces in a state in which the workpieces are further deflected by the correction amount, there will remain no distortion in the product.

As explained hereinabove, the present invention performs the correction in a feedforward manner depending on the distortion of the workpieces to be worked on this time. Therefore, a product of higher accuracy can be obtained from the beginning and also fluctuations in respective workpieces can be dealt with, resulting in a largely improved productivity.

In order to better carry out the present invention, it is preferable that the clamp units comprise a reference clamp unit for clamping a particular portion of the workpieces at a specified position, and movable clamp unit/units for clamping another portion/other portions of the workpieces and being controllable for movement in a clamping direction so that the workpieces can be deflected as described above by the movement of the movable clamp unit/units.

In case there is provided one movable clamp unit, the following procedures may be followed. Namely, in the first step, the workpieces are clamped by the reference clamp unit and are also clamped by the movable clamp unit while positioning the movable clamp unit in a predetermined reference position in the clamping direction, to thereby measure the deflection amount at the clamped portion by the movable clamp unit at the time of clamping. In the second step, a distortion amount between a clamped portion of the workpieces by the reference clamp unit and a clamped portion of the workpieces by the movable clamp unit is computed based on the deflection amount measured in the first step (in principle, the distortion amount coincides with the deflection amount). In the third step, that correction amount of the workpieces at the clamped portion by the movable clamp unit which is required to eliminate the distortion after the workpieces have been combined is computed. In the fourth step, the movable clamp unit is moved to thereby further deflect the workpieces at the clamped portion by the movable clamp unit by the correction amount as computed in the third step.

In case there are provided a plurality of movable clamp units, the following procedures may be followed. Namely, in the first step, the workpieces are clamped by the reference clamp unit and are also clamped by the plurality of movable clamp units while positioning each of the movable clamp units in a predetermined reference position in the clamping direction, to thereby measure a deflection amount at each of the clamped portions by each of the movable clamp units at the time of clamping. In the second step, a distortion amount between the respective adjoining clamped portions of the workpieces inclusive of the clamped portion by the reference clamp unit is computed from a correlation of the deflection amount at each of the clamped portions. In the third step, based on the distortion amount between the respective adjoining clamped portions, that correction amount of the workpieces at the clamped portion by each of the movable clamp units which is required to eliminate the distortion after the workpieces have been combined is computed. In the fourth step, each of the movable clamp units is moved to thereby further deflect the workpieces at each of the clamped portions by each of the clamp units by the correction amount as computed for each of the clamped portions.

In case there is provided only one movable clamp unit to thereby clamp one end and the other end of the workpieces with the reference clamp unit and the movable clamp unit, respectively, a distortion is likely to remain in an intermediate portion of the product. Therefore, it is preferable to provide a plurality of movable clamp units so that the intermediate portion/portions of the workpieces can also be clamped.

The measurement of the deflection amount in the first step can also be made in an optical manner. This will however require a large scale of measuring equipment and a consequent higher cost.

Here, if the workpieces have a distortion, the pressurizing reaction force of the workpieces will be off, or away from, the reference value of the pressurizing reaction force by an amount of the force which is required to deflect the workpieces by the distortion amount. Therefore, if the pressurizing reaction force of the workpieces by each of the movable clamp units is detected in the first step, it is possible to compute the deflection amount at the clamped portion of the workpieces by the movable clamp unit based on the deviation, off the reference value, of the detected value of the pressurizing reaction force. According to this arrangement, it is enough to mount on each of the movable clamp units a force detecting means to detect the pressurizing reaction force. This is advantageous from the viewpoint of cost. Further, an overall deflecting reaction force (a springing-back force) of a plurality of workpieces to be clamped by the movable clamp units can be detected, and the computation of the correction amount becomes easy.

Due to the change with time (or deterioration) of the detecting means and the movable clamp unit/units, the detected value of the pressurizing reaction force to be detected by the detecting means when the workpieces without distortion are clamped will sometimes deviate from the reference value. Without a mending measure, it will then become impossible to correctly measure the distortion of the workpieces. If, on the other hand, the reference clamp unit is left unclamped, the workpieces will move freely, when they are clamped by the movable clamp unit, by an amount corresponding to the distortion even if there is a distortion in the workpieces. The pressurizing reaction force will thus become equal to a value without distortion. Therefore, if that detected value of the pressurizing reaction force which is detected this time by the detecting means is set as the reference value, the reference value will coincide with the pressurizing reaction force of the workpieces with no distortion regardless of the change with time of the detecting means and the clamp units. In this manner, it is possible to accurately measure the deflection amount of the workpieces at the time of clamping due to the distortion of the workpieces from the deviation between the reference value and the detected value of the pressurizing reaction force when the workpieces are clamped by the reference clamp unit and the movable clamp unit/units.

In case there are provided a plurality of movable clamp units, when the workpieces are clamped at the same time by these movable clamp units, a free movement of the workpieces at the clamped portion by each of the movable clamp units is hindered. There is therefore a possibility that the pressurizing reaction force to be detected by the detecting means of each of the movable clamp units deviates from the pressurizing reaction force without a distortion. As a solution, in case there are provided a plurality of movable clamp units, it is preferable to clamp the workpieces, before clamping the workpieces by the reference clamp unit, by closing each of the movable clamp units, one at a time, to thereby set a detected value of the pressurizing reaction force to be detected at this time of clamping as the reference value of the pressurizing reaction force of each of the movable clamp units.

As the above-described detecting means, it is also possible to use a strain gauge which is adhered to an abutment tip (i.e., a tip to abut with the workpieces) of at least one of the stationary clamp piece and the movable clamp piece of the movable clamp unit. However, the abutment tip is an expendable and, if the strain gauge is adhered thereto, the detecting means must also be replaced when the abutment tip is replaced. This solution will therefore be expensive in the maintenance cost.

On the other hand, if an abutment tip to abut with the workpieces is attached in the clamping direction to a clamp piece in a movable manner, and if a load cell to receive the pressurizing reaction force via the abutment tip is provided to constitute the detecting means by the load cell, it is sufficient to replace only the abutment tip. This is advantageous from the viewpoint of the cost.

As the computing means for computing the correction amount in the third step, the following method may also be considered. Namely, various test workpieces with different distortions are prepared, and a most appropriate correction amount depending on the distortion amount is empirically obtained. It is then stored as a data table, and a correction amount corresponding to the measured distortion amount is searched in the data table. In this method, however, the combining tests must be performed by varying the correction amounts in various ways with respective workpieces. A vast amount of man-hours and cost will thus be required in preparing the data table.

As a method of computing the correction amount in which these disadvantages are eliminated, the following steps may be considered. Namely, a first empirical formula representing a relationship between a deflection amount of the workpieces before combining and the pressurizing reaction force, and a second empirical formula representing a relationship between a deflection amount of the workpieces after combining and the pressurizing reaction force are obtained. And the correction amount is computed based on such a deflection amount that a deviation in the pressurizing reaction force to be obtained from both the empirical formulas when an identical value is substituted in both the empirical formulas as a deflection amount becomes equal to a deflecting reaction force of the workpieces when a deflection corresponding to the distortion amount to be computed in the second step occurs.

Both the first and the second empirical formulas can easily be obtained automatically by the computing means by moving the movable clamp unit while clamping a master workpiece by the reference clamp unit and the movable clamp unit and inputting data from the force detecting means into a data sampling means while varying the deflection amount of the master workpiece. The above-described moving and inputting steps are performed with the master workpiece before and after combining thereof. In case there are provided a plurality of movable clamp units, both the empirical formulas at the clamped portion by the first clamp unit that is closest to the reference clamp unit are obtained in a similar manner as described above. Both the empirical formulas at a clamped portion by each of the second movable clamp unit and so forth are obtained by the computing means by the following steps. Namely, another/other movable clamp unit/units located between a concerned movable clamp unit and the reference clamp unit is positioned in the reference position. The concerned movable clamp unit is moved while clamping the master workpiece by the reference clamp unit, said another/other clamp unit/units, and the concerned clamp unit. Data from the force detecting means provided in the concerned movable clamp unit are inputted into the data sampling means while varying the deflection amount of the master workpiece. The above-described positioning, moving and inputting are performed with the master workpiece before and after combining.

The deviation in the pressurizing reaction forces to be obtained by the first and the second empirical formulas represents the force required to return the product, which has been combined in a state of being deflected, back to a state without deflection. Therefore, if the correction amount is computed as described above and the workpieces are combined by deflecting them by the correction amount, there will be applied to the product a force sufficient to return the product back to the state without deflection, as a springing-back force (deflection reaction force) due to the distortion of the workpieces. As a result, the product will return to a state without deflection, and no distortion remains in the product.

As described above, according to the above-described computing method, it is possible to accurately compute a most appropriate correction amount depending on the distortion amount of the workpieces by using empirical formulas that can be obtained easily. Man-hours and cost can thus be reduced. In addition, since empirical formulas for new types of products can also be obtained in a short time, the starting-up period for the production of the new types of products can be shortened and the productivity can be improved.

If the movable clamp unit is returned to the above-described reference position after the workpieces have been combined and, in this state, the pressurizing reaction force of the workpieces by the movable clamp unit is detected again, the detected value of the pressurizing reaction force will coincide with the reference value if no distortion is present in the product. Therefore, the distortion of the product can be measured by the detected value of the pressurizing reaction force. In this manner, the accuracy test of the product can advantageously be performed without using a special inspection apparatus on the jig.

The following steps may also be employed. Namely, the movable clamp unit is provided with a contact detecting means for detecting a contact thereof with the workpieces. The movable clamp unit is once separated from the product by unclamping after the product has been assembled by combining the workpieces. Thereafter, a time of contact of the movable clamp unit with the workpieces is detected by a signal from the contact detecting means by bringing the movable clamp unit closer to the product. A distortion of the product is measured from the position of the movable clamp unit at the time of this contact.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 2A–2E are views showing the principle of occurrence of distortion of a product and the principle of removal of the distortion;

FIG. 9 is a flow chart showing the steps of setting a reference value of the pressurizing reaction force.

DETAILED DESCRIPTION OF PREFERRED EMBODIMENTS

Figure 1:
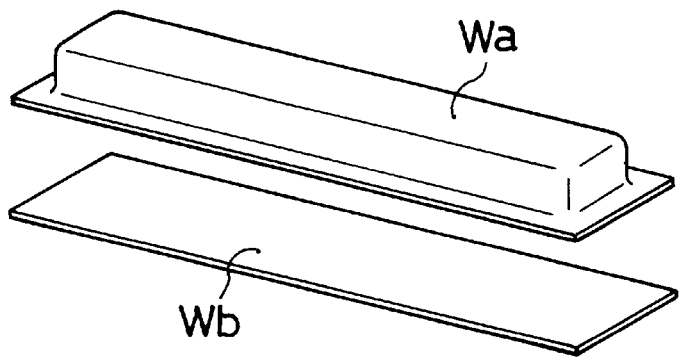
FIG. 1 is a perspective view of workpieces.

An explanation will now be made about an embodiment in which the present invention is applied to the assembling of a product W of a closed cross section by combining the above-described workpieces Wa, Wb as shown in FIG. 1 by means of spot welding, arc welding, gluing, or the like.

Figure 3:
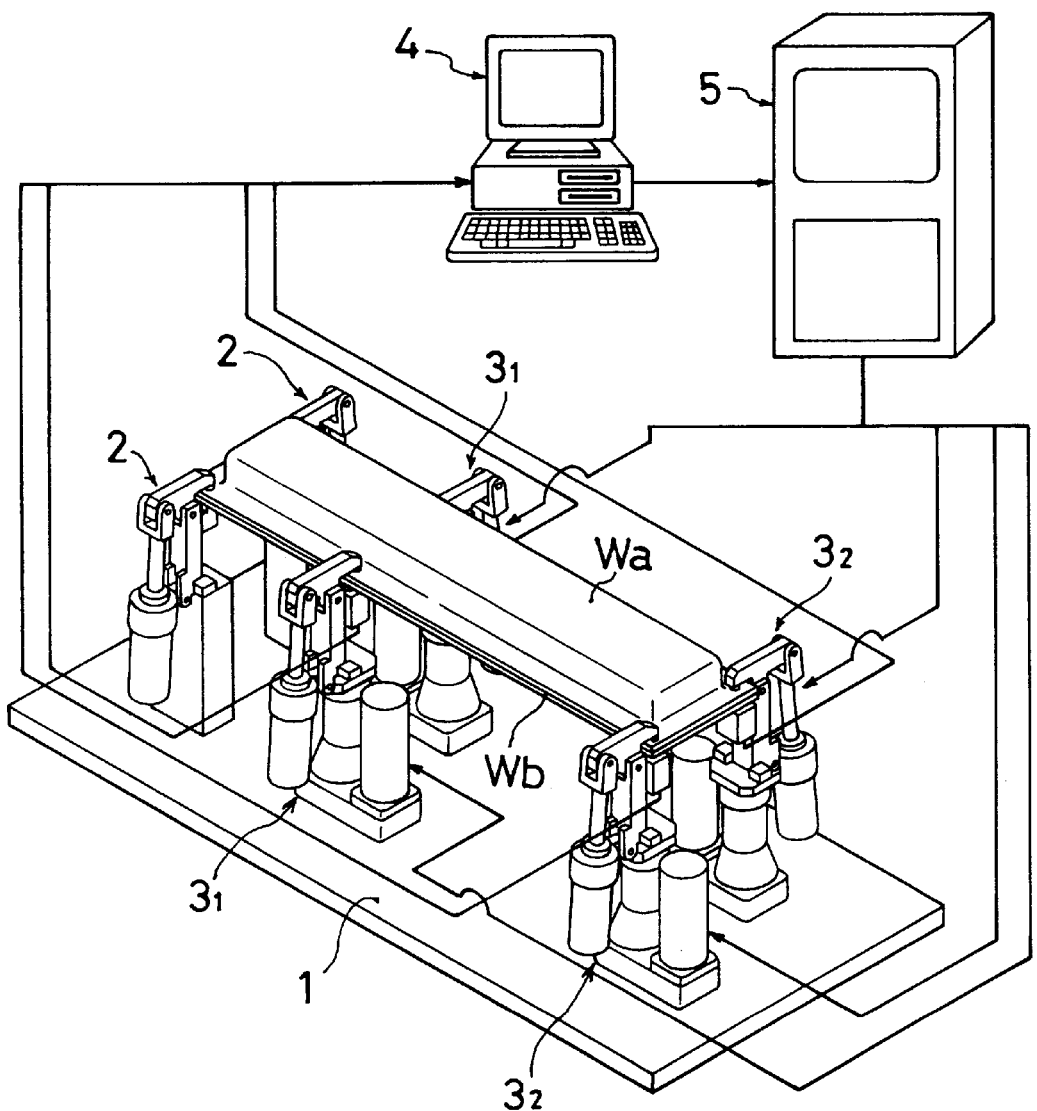
FIG. 3 is a perspective view of an apparatus to be used in carrying out the present invention.

With reference to FIG. 3, numeral 1 denotes a jig. This jig 1 is provided thereon with: a pair of reference (or standard) clamp units 2, 2 which clamp one end portion of the workpieces Wa, Wb at a fixed position; a pair of first movable clamp units $3_1$, $3_1$ which clamp an intermediate portion of the workpieces Wa, Wb and which can be controlled for vertical (up and down) movement; and a pair of second movable clamp units $3_2$, $3_2$ which clamp the other end portion of the workpieces Wa, Wb and which can be controlled for vertical movement.

Figure 4:
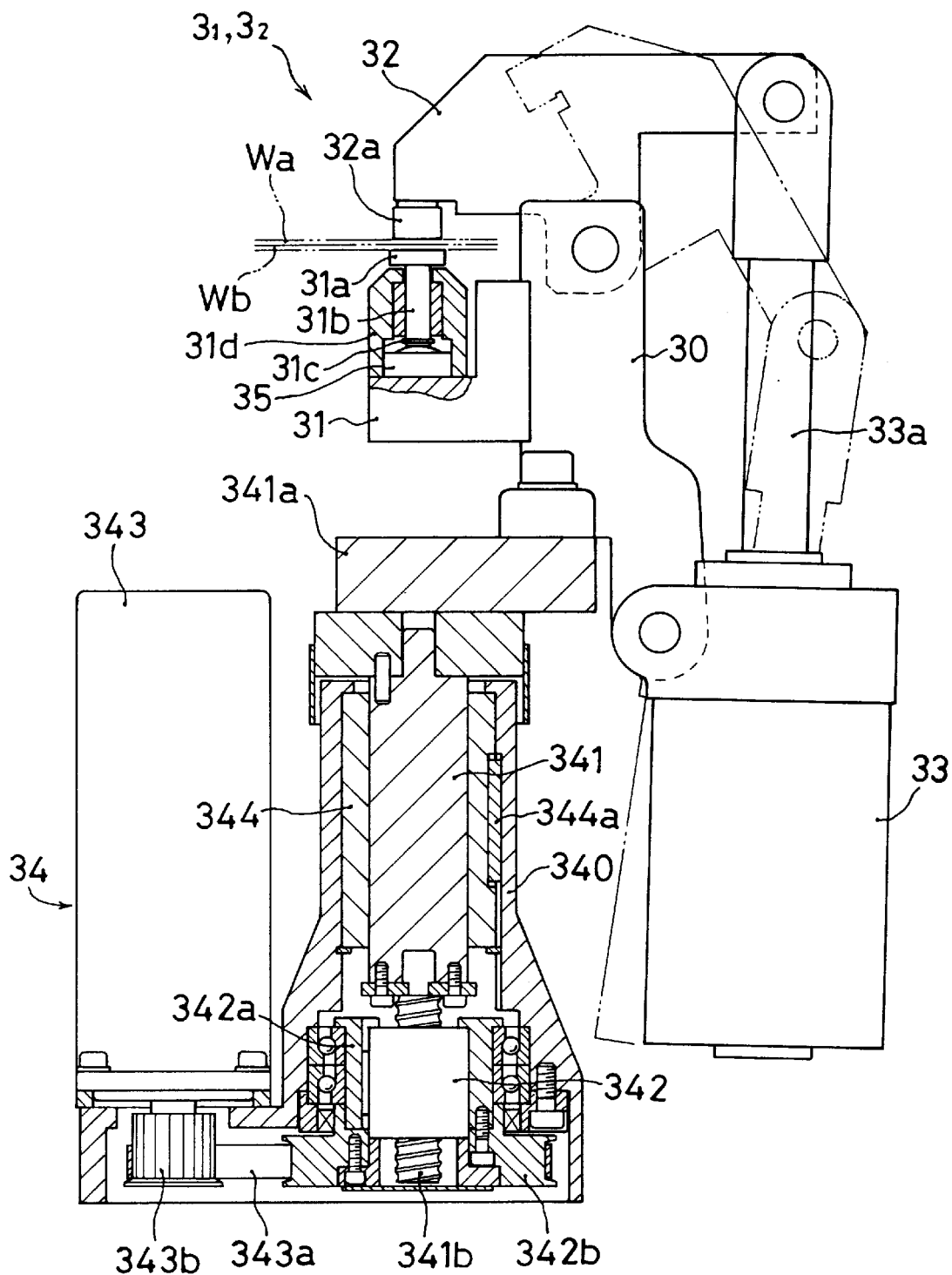
FIG. 4 is a sectional view of a movable clamp unit.

Each of the movable clamp units $3_1$, $3_2$ is provided, as shown in FIG. 4, with a lower stationary clamp piece 31 which is fixed to a bracket 30, and an upper movable clamp piece 32 which is pivotally mounted on the bracket 30 so as to be opened and closed in the vertical direction. A piston rod 33a of a pressurizing cylinder 33 which is swingably attached to a lower portion of the bracket 30 is connected to the movable clamp piece 32. It is thus so arranged that, when the movable clamp piece 32 is closed by the operation of the pressurizing cylinder 33, the workpieces Wa, Wb get clamped between abutment (or contact) tips 31a, 32a which are mounted on the respective clamp pieces 31, 32.

Though the above-described arrangement is similar to that of the reference clamp units 2, each of the movable clamp units $3_1$, $3_2$ is further provided with a moving mechanism 34 which moves the bracket 30 up and down, i.e., in the clamping direction, and a detecting means 35 which detects a pressurizing reaction force of the workpieces and which is mounted on at least one of the clamp pieces 31, 32, on the stationary clamp piece 31 in the illustrated example.

The moving mechanism 34 is made up of: an elevating rod 341 which is mounted in a vertically movable but non-rotatable manner by insertion into a casing 340 vertically provided on the jig 1 and which has on its upper end a mounting base 341a for the bracket 30; a nut 342 which is engaged in a screwed or threaded manner with a screwed rod 341b mounted on a lower end of the elevating rod 341 and which is rotatably supported on a bottom inner surface of the casing 340 via a holder 342a; and a servomotor 343, as a driving source, having that pulley 343b on an output shaft of the servomotor which is connected via a belt 343a to a pulley 342b which is connected to a lower end of the holder 342a. Thus, by rotating the nut 342 in positive or reverse direction by means of the servomotor 343, the bracket 30 is moved up and down via the elevating rod 341. On an outer circumference of the elevating rod 341 there are formed spline grooves (not illustrated). A ball spline sleeve 344 which contains therein balls to be engaged with the spline grooves is fitted by insertion into the casing 340 in a manner to be non-rotatable by a key 344a.

The detecting means 35 is constituted or made by a load cell which is embedded into the stationary clamp piece 31. The abutment tip 31a is inserted at its shaft portion 31b into the stationary clamp piece 31 so as to be freely movable up and down. The shaft portion 31b is abutted with the load cell 35 so that the pressurizing reaction force of the workpieces is received by the load cell 35 via the abutment tip 31a. The abutment tip 31a is prevented from being pulled out of position relative to the stationary clamp piece 31 by means of a circlip (or a snap ring) 31c which is attached to the shaft portion 31b of the clamp piece 31. A tip mounting portion 31d of the stationary clamp piece 31 is separably mounted on a main body of the clamp piece 31. The abutment tip 31a can thus be replaced by removing the snap ring 31c in a state in which the tip mounting portion 31d is separated.

A detected signal from each of the load cells 35 is sent to a personal computer 4 as shown in FIG. 3. An amount of distortion (or a distortion amount) of the workpieces is computed by the personal computer 4 based on detected values of the pressurizing reaction force of the workpieces. Based on this distortion amount, there is computed that correction amount of the workpieces which is required to make sure that no distortion remains when the workpieces are combined. The data relating to this correction amount are sent to a control panel 5 for the jig 1. The servomotor 343 of the moving mechanism 34 in each of the movable clamp units $3_1$, $3_2$ is operated by a command signal from the control panel 5. Each of the movable clamp units $3_1$, $3_2$ is displaced from a predetermined vertically defined reference position by the correction amount by the movement of the bracket 30. In this displaced condition, the workpieces are combined by means of welding robots or the like (not illustrated).

An explanation will be made hereinbelow about the methods of computing the distortion amount and the correction amount.

Figure 5:
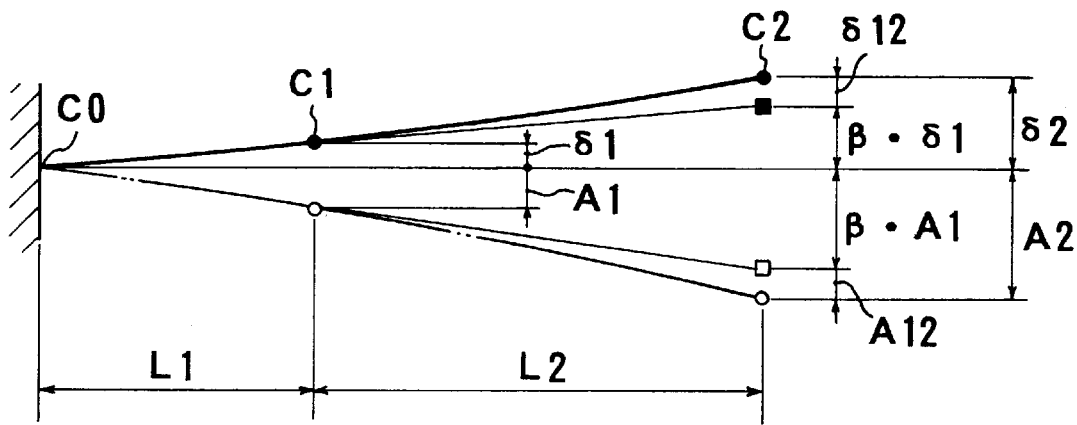
FIG. 5 is a graph showing the distortion amount and the correction amount of the workpieces.

The condition in which the workpieces Wa, Wb are clamped by the reference clamp units 2 can be regarded as a cantilever with the portion clamped by the reference clamp units 2 as a fixed end C0 as shown in FIG. 5. In the figure, reference mark C1 denotes a clamped portion clamped by the first movable clamp units $3_1$, and reference mark C2 denotes a clamped portion clamped by the second movable clamp units $3_2$. Let us assume that the workpieces have a distortion amount of $\delta 1$ between C0 and C1 and a distortion amount of $\delta 12$ between C1 and C2. By the way, since C2 has already been displaced by $\beta \cdot \delta 1$ under the influence of the distortion at C1, an apparent distortion amount $\delta 2$ at C2 relative to the reference position will be $$\delta 2 = \delta 12 + \beta \cdot \delta 1$$

where $\beta \div (L1+L2)/L1$ provided the distance between C0 and C1 is L1, and the distance between C1 and C2 is L2. The distortion amount is defined to be positive when the direction of distortion is upward and is defined to be negative when the direction of distortion is downward.

When the workpieces are clamped at the reference position, the workpieces will be forcibly deflected by a distortion amount $\delta$. The pressurizing reaction force to be received by the lower stationary clamp piece 31 will be reduced by an amount equivalent to the force required to deflect the workpieces. Let the force required to deflect the workpieces by a unit length at the clamped position be $\alpha$. Then, the force required to deflect the workpieces by a distortion amount $\delta$ will be $\delta \cdot \alpha$. Let a reference value of clamping force be Ps, and let the pressurizing reaction force to be detected by the load cells 35 be P. Then, $$P = Ps - \delta \cdot \alpha$$

$$\delta = (Ps - P)/\alpha$$

Thus, from a deviation $\Delta P$ (=Ps−P), relative to (or off) the reference value Ps, of the detected value P of the pressurizing reaction force, the deflection amount at the time of clamping, i.e., the distortion amount $\delta$ can be computed.

As in the present embodiment, in case C1 and C2 are clamped, the pressurizing reaction force at C1 and the pressurizing reaction force at C2 mutually affect each other. Let a deviation, off the reference value, of the detected value of the load cell 35 provided in each of the first movable clamp units $3_1$ be $\Delta P1$, and let the deviation, off the reference value, of the detected value of the load cell 35 provided in each of the second movable clamp units $3_2$ be $\Delta P2$. Then, $$\Delta P1 = \delta 1 \cdot \alpha 11 + \delta 2 \cdot \alpha 21 \quad (1)$$

$$\Delta P2 = \delta 1 \cdot \alpha 12 + \delta 2 \cdot \alpha 22 \quad (2)$$

where $\alpha 11 \ldots \alpha 22$ are coefficients obtained by carrying out deflection tests by clamping a master workpiece of the workpieces Wa, Wb. In other words, when the first movable clamp units $3_1$ are displaced by a unit length in a state in which the second movable clamp units $3_2$ are fixed to the reference position, an amount of change (or a change amount) in the pressurizing reaction force to be detected by the load cell 35 provided in each of the first movable clamp units $3_1$ is $\alpha 11$, and a change amount in the pressurizing reaction force to be detected by the load cell 35 provided in each of the second movable clamp units $3_2$ is $\alpha 12$. When the second movable clamp units $3_2$ are displaced by a unit length in a state in which the first movable clamp units $3_1$ are fixed to the reference position, a change amount in the pressurizing reaction force to be detected by the load cell 35 provided in each of the first movable clamp units $3_1$ is $\alpha 21$, and a change amount in the pressurizing reaction force to be detected by the load cell 35 provided in each of the second movable clamp units $3_2$ is $\alpha 22$.

From the formulas (1) and (2), $\delta 1$ and $\delta 2$ can be obtained as follows.

$$\delta1=(\alpha22\cdot\Delta P1-\alpha21\cdot\Delta P2)/(\alpha11\cdot\alpha22-\alpha12\cdot\alpha21) \quad (3)$$

$$\delta2=(\alpha11\cdot\Delta P2-\alpha12\cdot\Delta P1)/(\alpha11\cdot\alpha22-\alpha12\cdot\alpha21) \quad (4)$$

A true distortion amount δ12 at C2 will be $$\begin{aligned}\delta12 &= \delta2 - \beta - \delta1 \\ &= \{(\alpha11+\beta\cdot\alpha21)\Delta P2 - (\alpha12+\beta\cdot\alpha22)\Delta P1\}/ \\ &\quad (\alpha11\cdot\alpha22-\alpha12\cdot\alpha21)\end{aligned} \quad (5)$$

Figure 6:
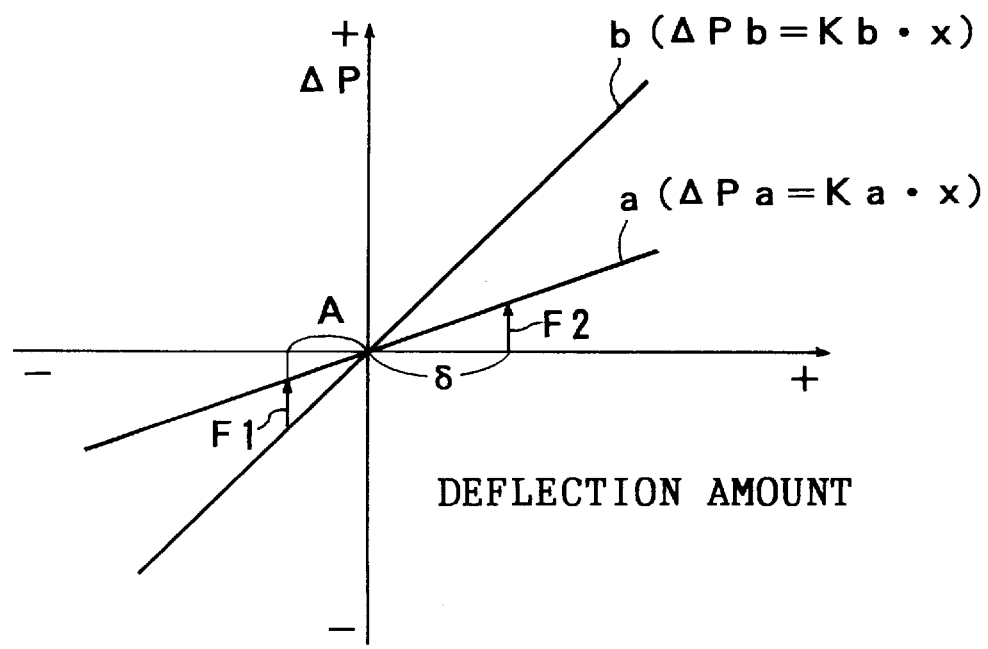
FIG. 6 is a graph showing the relationship between the deflection amount and the pressurizing reaction force of the workpieces.

FIG. 6 is a graph showing the relationship between the deflection amount and the pressurizing reaction force to be detected by the load cells 35, at the time when the master workpiece is deflected by moving up and down the clamp units in a state in which the master workpiece is clamped. In the graph, line "a" is a line of relationship before the workpieces are combined, and line "b" is a line of relationship after the workpieces have been combined. The abscissa represents the deflection amount, provided that the state in which the master workpiece is deflected upwards from the state in which the clamp units are in the reference position, i.e., the state of no deflection, is defined to be positive, and that the state in which it is deflected downwards is defined to be negative. The ordinate represents the deviation ΔP, off the reference value (the pressurizing reaction force when the clamp units are in the reference position), of the detected value of the pressurizing reaction force provided that the case where the detected value is larger than the reference value is defined to be positive, and that the case where it is smaller than the reference value is defined to be negative.

When the product is assembled by combining the workpieces in their deflected state, it is necessary to apply a force corresponding to ΔPb to be obtained by the line "b" in a direction opposite to the direction of deflection in order to return the product to a state without deflection. Here, there still remains in the workpieces a restoration force corresponding to ΔPa to be obtained by the line "a." Therefore, if a force F1 corresponding to the deviation (or difference) between ΔPb and ΔPa is applied to the product, it will return to a state without deflection. When there is a distortion in the workpieces, a deflection reaction force (spring-back force) F2 corresponding to the distortion amount δ is applied to the product. If the forces F1 and F2 become equal to each other, the product will be back to the state without deflection, and there will remain no distortion in the product.

In carrying out deflection tests to obtain empirical formulas representing the lines "a" and "b," the following steps are taken. Namely, moving pitches of the movable clamp units $3_1$, $3_2$ are set by the personal computer 4. With a command from the control panel 5, the movable clamp units $3_1$, $3_2$ are moved up and down by the set pitch. At every movement by one pitch the data detected by the load cells 35 are read into the personal computer 4. Then, empirical formulas to represent the lines "a" and "b" are computed by means of regression processing or the like from sampling data. Let the deflection amount be x, and the formula of the line "a" be ΔPa=fa(x), and the formula of the line "b" be ΔPb=fb (x). Then $$F1=fa(x)-fb(x)$$

$$F2=fa(\delta)$$

The deflection correction amount (the amount of correcting the deflection) A required to eliminate the distortion in the product should be able to satisfy the following formula $$fa(A)-fb(A)=fa(\delta)$$

Hence, from this formula the correction amount A applicable to the distortion amount δ can be obtained.

If the lines "a" and "b" are straight as illustrated and if $$\Delta Pa=Ka\cdot x$$

and $$\Delta Pb=Kb\cdot x$$

the following equation should hold $$Ka\cdot A-Kb\cdot A=Ka\cdot\delta$$

If γ=Ka/(Ka−Kb), then we have $$A=\gamma\cdot\delta$$

In case C1 and C2 are clamped as in the present embodiment, the master workpiece is clamped by the reference clamp units 2 and the first movable clamp units $3_1$. In a state in which the second clamp units $3_2$ stand clear of the workpiece, the first movable clamp units $3_1$ are moved up and down to thereby obtain a coefficient Ka1 which represents the relationship between the deflection amount and the pressurizing reaction force at C1 before the combination of the master workpiece, and a coefficient Kb1 which represents the relationship between the deflection amount and the pressurizing reaction force at C1 after the combination of the master workpiece. A computed coefficient γ1 of the correction amount A1 at C1 is then computed by the following formula $$\gamma1=Ka1/(Ka1-Kb1)$$

Further, the master workpiece is clamped by the reference clamp units 2 and the first movable clamp units $3_1$, respectively, at the reference position, and the second clamp units $3_2$ are moved up and down in a state in which the master workpiece is clamped. A coefficient Ka2 which represents the relationship between the deflection amount and the pressurizing reaction force at C2 before the combination of the master workpiece, and a coefficient Kb2 which represents the relationship between the deflection amount and the pressurizing reaction force at C2 after the combination of the master workpiece /are obtained. A computed coefficient γ2 of the correction amount A2 at C2 is then computed by the following formula $$\gamma2=Ka2/(Ka2-Kb2)$$

Then, based on the distortion amount δ1 of the workpieces at C1, the correction amount A1 at C1 is computed by the following formula $$A1=\gamma1\cdot\delta1 \quad (6)$$

The correction amount A2 at C2 will, on the other hand, be a value obtained by adding a displacement amount β· A1 at C2 due to the correction amount A1 at C1 (where β≈(L1+L2)/L1) to a correction amount A12 which corresponds to a true distortion amount δ12 of the workpieces at C2. Hence, A2 will be $$\begin{aligned}A2 &= \beta\cdot A1 + A12 \\ &= \beta\cdot A1 + \gamma2\cdot\delta12 \\ &= \beta\cdot\gamma1\cdot\delta1 + \gamma2(\delta2-\beta\cdot\delta1) \\ &= \gamma2\cdot\delta2 + \beta(\gamma1-\gamma2)\delta1\end{aligned} \quad (7)(8)$$

Figure 7:
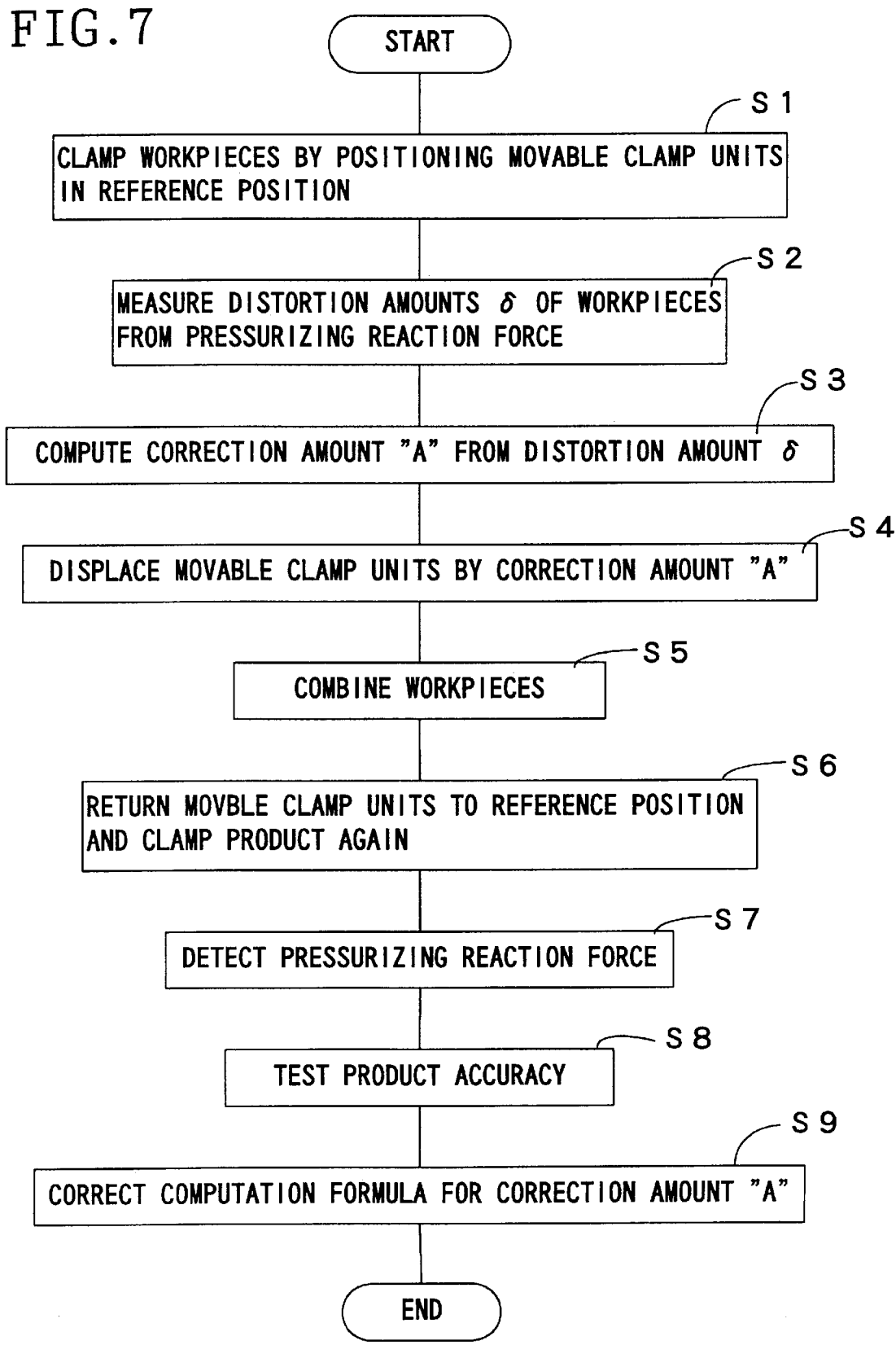
FIG. 7 is a flow chart showing the assembling steps of the product.

The working procedures of assembling the product W by combining the workpieces Wa, Wb are shown in FIG. 7.

First, in a state in which the reference clamp units 2 and both the first and the second movable clamp units $3_1$, $3_2$ are all positioned in the reference position, the workpieces Wa, Wb are clamped (S1). The detected data from the load cells 35 of the respective movable clamp units $3_1$, $3_2$ at the time of this clamping are read into the personal computer 4. With this personal computer 4 a distortion amount $\delta 1$ at C1 is computed by the above formula (3), and an apparent distortion amount $\delta 2$ at C2 is computed by the above formula (4), or a true distortion amount $\delta 12$ at C2 is computed by the above formula (5) (S2). Then, a correction amount A1 is computed by substituting the computed value of $\delta 1$ into the above formula (6), and a correction amount A2 at C2 is computed by substituting the computed value of $\delta 12$ into the above formula (7) or by substituting the computed value of $\delta 2$ into the above formula (8) (S3).

Thereafter, the data of the correction amounts A1, A2 are transmitted from the personal computer 4 to the control panel 5. By a command from the control panel 5, the first and the second movable clamp units $3_1$, $3_2$ are displaced, in a once unclamped condition, respectively by the correction amounts A1 and A2 off (or from) the reference position and the workpieces Wa, Wb are clamped again (S4). In this state, the workpieces Wa, Wb are combined (S5).

Further, after the workpieces have been combined, each of the movable clamp units $3_1$, $3_2$ is once unclamped while the product W is kept clamped by the reference clamp units 2. Each of the movable clamp units $3_1$, $3_2$ is returned to the reference position and the product W is clamped again (S6). Then, a pressurizing reaction force of each of the movable clamp units $3_1$, $3_2$ is detected (S7). By the deviation, off the reference value, of the detected value of the pressurizing reaction force, the presence or absence of distortion in the workpieces W is confirmed to thereby perform an accuracy test of the product W (S8). When there still remains a distortion in the product W, a correction is made to the computation formula for computing the correction amount A based on the distortion amount $\delta$ so that the correction amount A can be correctly computed through a learning control (S9).

Figure 8:
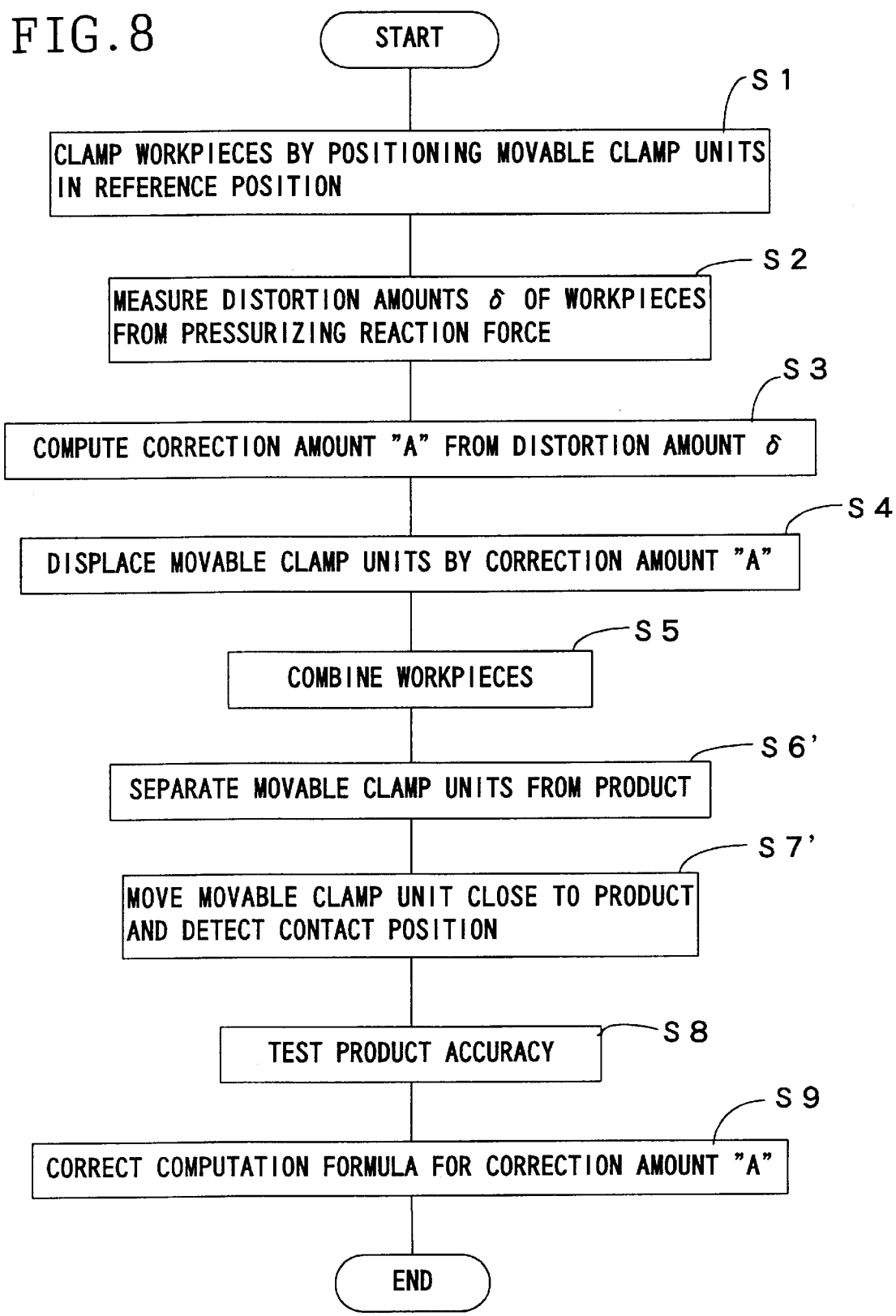
FIG. 8 is a flow chart showing another embodiment of the assembling steps of the product.

FIG. 8 shows another embodiment of the working procedures of assembling the product W. In this embodiment, the steps up to the combination of the workpieces are performed in the same procedures as in the above embodiment, but the method of accuracy inspection of the product W is different from that of the above embodiment. Namely, in this embodiment, after the workpieces have been combined, each of the movable clamp units $3_1$, $3_2$ is unclamped and is moved down while the product W is being clamped by the reference clamp units 2 to thereby separate each of the movable clamp units $3_1$, $3_2$ below the product W (S6'). At this time, if there remains no distortion in the product W, each of the clamped portions of the product W will be sprung (or restored) back to the reference position.

Thereafter, while monitoring the signals of the load cells 35 of each of the movable clamp units $3_1$, $3_2$ with the personal computer 4, each of the movable clamp units $3_1$, $3_2$ is moved up. In this case, when the abutment tips 31a of the stationary clamp pieces 31 of each of the movable clamp units $3_1$, $3_2$ are brought into abutment with the product W, the detected signals of the load cells 35 vary. Therefore, when each of the movable clamp units $3_1$, $3_2$ is moved up, an input gain of the signals from the load cells 35 is set large. Thus, the time when the detected value of the pressurizing reaction force has attained a predetermined minute value (e.g., 0.3 kg) is determined to be the time when the abutment tip 31a has abutted with (or contacted) the product W. The position (contact position) of each of the movable clamp units $3_1$, $3_2$ at this time of abutment is detected by a signal from the servo motor 343 (S7').

If there remains a distortion in the product W, the contact position will deviate off the reference position by a distortion amount of the product W. Therefore, the accuracy inspection of the product W can be performed by measuring the distortion of the product W from the deviation of the contact position off the reference position.

Although the contact with the product W is detected by the load cells 35 in this embodiment, it is also possible to detect the contact with the product W with an exclusively used sensor such as a proximity switch or the like. However, from the viewpoint of cost, it is more advantageous to use the load cell 35 for detecting the pressurizing reaction force for the dual purpose as the sensor for detecting the contact with the product W.

The pressurizing reaction forces to be detected by the load cells 35 are sometimes off the reference value when the workpieces without distortion are clamped by the movable clamp units $3_1$, $3_2$. This is due to a change with time of the load cells 35, wear in rotatably supporting portions of the movable clamp pieces 32 of the movable clamp units $3_1$, $3_2$, or the like. This will give rise to an error in the distortion amounts $\delta 1$, $\delta 2$ and $\delta 12$ to be computed in the above-described formulas (3), (4) and (5).

As a solution, in the present embodiment, the following procedures have been employed as shown in FIG. 9. Namely, after having set the workpieces Wa, Wb on the jig 1 (S100), the workpieces Wa, Wb are first clamped by positioning the first movable clamp units $3_1$ in the reference position in a state in which the reference clamp units 2 and the second movable clamp units $3_2$ are unclamped (S101). The detected value P1 of the pressurizing reaction force to be detected at this time by the load cells 35 of the first movable clamp units $3_1$ is stored in the personal computer 4 as a reference value P1s of the pressurizing reaction force for the first movable clamp units $3_1$ (S 102). Then, in a state in which the reference clamp units 2 and the first movable clamp units $3_1$ are unclamped, the second movable clamp units $3_2$ are positioned in the reference position and clamp the workpieces Wa, Wb (S103). A detected value P2 of the pressurizing reaction force to be detected at this time by the load cells 35 of the second movable clamp units $3_2$ is stored in the personal computer 4 as a reference value P2s of the pressurizing reaction force for the second movable clamp units $3_2$ (S104). It is thus so arranged that the reference value is renewed at each time or at every predetermined number of times.

In this manner, if the workpieces Wa, Wb are clamped only at one place by each of the movable clamp units $3_1$, $3_2$, the workpieces can move freely without being restrained at the other clamped portions even if there is a distortion in any one of the workpieces. Therefore, the pressurizing reaction force to be detected at that time will be the same as that without a distortion in the workpieces. It follows that, if the reference values P1s, P2s for each of the movable clamp units $3_1$, $3_2$ are set as described above, the reference values P1s, P2s will coincide with the pressurizing reaction force when the workpieces without distortions are clamped. In this manner, when the workpieces Wa, Wb are clamped by the reference clamp units 2 and the first and second movable clamp units $3_1$, $3_2$ the deviations $\Delta$P1, $\Delta$P2, off the reference values P1s, P2s, of the detected values P1, P2 of the pressurizing reaction forces to be detected by the load cells 35 of each of the movable clamp units $3_1$, $2_2$ will coincide with the deflection reaction force corresponding to an amount of distortion of the workpieces at each of the clamped positions C1, C2. By substituting these deviations ΔP1, ΔP2 into the above-described formulas (3), (4), and (5), the distortion amounts δ1, δ2, δ12 can be accurately computed.

Although it may be possible to eliminate the first movable clamp units $3_1$, there will then be a possibility that a distortion remains in an intermediate portion of the product W. Therefore, in order to increase the accuracy of the product W, it is desirable to provide two sets of the first and the second movable clamp units $3_1$, $3_2$ as in the present embodiment. It is also possible to provide the movable clamp units in three sets or more.

It is readily apparent that the above-described method of combining workpieces meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of combining workpieces in which two or more workpieces are set in position on a jig having mounted thereon clamp units and the workpieces are combined while being clamped by the clamp units, said method comprising:
   a first step of measuring that deflection amount of the workpieces which occurs when the workpieces set on the jig are clamped by the clamp units;
   a second step of computing a distortion amount of the workpieces from said measured deflection amount;
   a third step of computing, based on said computed distortion amount, a correction amount of the workpieces required to eliminate a distortion after the workpieces have been combined;
   a fourth step of further deflecting the workpieces by said computed correction amount by moving the clamp units; and
   a fifth step of combining the workpieces while keeping the workpieces in a deflected state of the fourth step.

2. A method of combining workpieces according to claim 1, in which the clamp units comprise a reference clamp unit for clamping a particular portion of the workpieces at a specified position, and a movable clamp being controllable for movement in a clamping direction, wherein:
   in said first step, the workpieces are clamped by the reference clamp unit and are also clamped by the movable clamp unit while positioning the movable clamp unit in a predetermined reference position in the clamping direction, to thereby measure said clamp unit at the time of clamping;
   in said second step, the distortion amount of the workpieces between the clamped portion by the reference clamp unit and the clamped portion by the movable clamp unit is computed based on said deflection amount measured in said first step;
   in said third step, that correction amount of the workpieces at the clamped portion by the movable clamp unit which is required to eliminate the distortion after the workpieces have be combined is computed; and
   in said fourth step, the movable clamp unit is moved to thereby further deflect the workpieces at the clamped portion by the movable clamp unit by said correction amount as computed in said third step.

3. A method of combining workpieces according to claim 2, in which the movable clamp unit further comprisesa force detecting means for detecting a pressurizing reaction force of the workpieces, wherein said deflection amount is obtained based on a deviation, off a reference value, of a detected value of the pressurizing reaction force to be detected by the force detecting means when the workpieces are clamped by the movable clamp unit in said first step.

4. A method of combining workpieces according to claim 3, wherein before clamping the workpieces by the reference clamp unit, the workpieces are clamped by positioning the movable clamp unit in said reference position to thereby set a detected value of the pressurizing reaction force to be detected at this time of clamping as said reference value.

5. A method of combining workpieces according to claim 3, further comprising the step of obtaining a first empirical formula representing a relationship between a deflection amount of the workpieces and the pressurizing reaction force before combining, and a second empirical formula representing a relationship between a deflection amount of the workpieces and the pressurizing reaction force after combining,
   wherein said correction amount is computed based on such a deflection amount that a deviation in the pressurizing reaction force to be obtained from both said empirical formulas when an identical value is substituted in both said empirical formulas as a deflection amount becomes equal to a deflecting reaction force of the workpieces when a deflection corresponding to said distortion amount to be computed in said second step occurs.

6. A method of combining workpieces according to claim 5, further comprising the steps of:
   moving the movable clamp unit while clamping a master workpiece by the reference clamp unit and the movable clamp unit; and
   inputting data from the force detecting means into a data sampling means while varying said deflection amount of the master workpiece, said steps of moving and inputting being performed with the master workpiece before and after combining thereof, thereby obtaining by the computing means said first empirical formula and said second empirical formula.

7. A method of combining workpieces according to claim 3, further comprising the steps of:
   returning the movable clamp unit to said reference position after combining the workpieces; and
   based on a detected value of the pressurizing reaction force to be detected in this state by the detecting means, measuring a distortion of a product assembled by combining the workpieces.

8. A method of combining workpieces according to claim 3, wherein an abutment tip to abut with the workpieces is attached in a movable manner in the clamping direction to at least one of the stationary clamp piece and the movable clamp piece of the movable clamp unit/units, and wherein a load cell to receive the pressurizing reaction force via the abutment tip is provided to constitute the detecting means by the load cell.

9. A method of combining workpieces according to claim 2, in which the movable clamp unit comprises a contact detecting means for detecting a contact thereof with the workpieces, said method further comprising the steps of:
   once separating the movable clamp unit from a product by unclamping after the product has been assembled by combining the workpieces;
   thereafter detecting by a signal from the contact detecting means a time of contact of the movable clamp unit with the product by bringing the movable clamp unit closer to the product; and measuring a distortion of the product from the position of the movable clamp unit at the time of the contact.

10. A method of combining workpieces according to claim 1, in which the clamp units comprise a reference clamp unit for clamping a particular portion of the workpieces at a specified position, and a plurality of movable clamp units for clamping a plurality of other portions of the workpieces and being controllable for movement in a clamping direction, wherein:

in said first step, the workpieces are clamped by the reference clamp unit and are also clamped by the plurality of movable clamp units while positioning each of the movable clamp units in a predetermined reference position in the clamping direction, to thereby measure a deflection amount at each of the clamped portions by each of the movable clamp units at the time of clamping;

in said second step, a distortion amount of the workpieces between the respective adjoining clamped portions of the workpieces inclusive of the clamped portion by the reference clamp unit is computed from a correlation of the deflection amount at each of the clamped portions;

in said third step, based on said distortion amount between the respective adjoining clamped portions, that correction amount of the workpieces at the clamped portion by each of the movable clamp units which is required to eliminate the distortion after the workpieces have been combined is computed; and in said fourth step, each of the movable clamp units is moved to thereby further deflect the workpieces at each of the clamped portions by each of the clamp units by said correction amount as computed for each of the clamped portions.

11. A method of combining workpieces according to claim 10, in which each of the movable clamp units further comprises a force detecting means for detecting a pressurizing reaction force of the workpieces, wherein said deflection amount is obtained based on a deviation, off a reference value, of a detected value of the pressurizing reaction force to be detected by the force detecting means when the workpieces are clamped by each of the movable clamp units in said first step.

12. A method of combining workpieces according to claim 11, wherein before clamping the workpieces by the reference clamp unit, the workpieces are clamped by positioning each of the movable clamp units in said reference position, one at a time, to thereby set a detected value of the pressurizing reaction force to be detected at this time of clamping as said reference value of the pressurizing reaction force of each of the movable clamp units.

13. A method of combining workpieces according to claim 11, further comprising the step of obtaining a first empirical formula representing a relationship between a deflection amount of the workpieces and the pressurizing reaction force before combining, and a second empirical formula representing a relationship between a deflection amount of the workpieces and the pressurizing reaction force after combining, wherein said correction amount is computed based on such a deflection amount that a deviation in the pressurizing reaction force to be obtained from both said empirical formulas when an identical value is substituted in both said empirical formulas as a deflection amount becomes equal to a deflecting reaction force of the workpieces when a deflection corresponding to said distortion amount to be computed in said second step occurs.

14. A method of combining workpieces according to claim 13, further comprising the steps of:

moving a first movable clamp unit closest, among the plurality of movable clamp units, to the reference clamp unit, while clamping the master workpiece by the reference clamp unit and the first movable clamp unit, inputting data from the force detecting means provided in the first movable clamp unit into a data sampling means while varying said deflection amount of the master workpiece, said steps of moving and inputting being performed with the master workpiece before and after combining thereof, thereby obtaining by the computing means said first empirical formula and said second empirical formula at the clamped portion by said first movable clamp unit;

wherein said first empirical formula and said second empirical formula at a clamped portion of each of the second movable clamp unit and so forth are obtained by the steps of: positioning another/other movable clamp unit/units located between a concerned movable clamp unit and the reference clamp unit in said reference position; moving the concerned movable clamp unit while clamping the master workpiece by the reference clamp unit, said another/other movable clamp unit/ units, and the concerned clamp unit; and inputting data from the force detecting means provided in the concerned movable clamp unit into the data sampling means while varying the deflection amount of the master workpiece, said steps of positioning, moving and inputting being performed with the master workpiece before and after combining.

15. A method of combining workpieces according to claim 11, further comprising the steps of:

returning each of the movable clamp units to the reference position after combining the workpieces; and based on a detected value of the pressurizing reaction force to be detected in this state by the detecting means of each of the movable clamp units, measuring a distortion of a product assembled by combining the workpieces.

16. A method of combining workpieces according to claim 10, in which each of the movable clamp units comprises a contact detecting means for detecting a contact thereof with the workpieces, said method further comprising the steps of:

once separating each of the movable clamp units from a product by unclamping after the product has been assembled by combining the workpieces;

thereafter detecting by a signal from the contact detecting means a time of contact of each of the movable clamp units with the product by bringing each of the movable clamp units closer to the product; and measuring a distortion of the product from the position of each of the movable clamp units at the time of the contact.

17. A method of combining workpieces according to claim 11, wherein an abutment tip to abut with the workpieces is attached in a movable manner in the clamping direction to at least one of the stationary clamp piece and the movable clamp piece of the movable clamp unit/units, and wherein a load cell to receive the pressurizing reaction force via the abutment tip is provided to constitute the detecting means by the load cell.

* * * * *

UNITED STATES PATENT AND TRADEMARK OFFICE
CERTIFICATE OF CORRECTION

PATENT NO. : 5,901,426
DATED : May 11, 1999
INVENTOR(S) : OKAZAKI et al.

It is certified that error appears in the above-identified patent and that said Letters Patent is hereby corrected as shown below:

In column 13, on line 45 in claim 2 "... clamp being ..." should be -- ... clamp unit for clamping another portion of the workpiece and being ... --

Also in column 13, on line 61 in claim 2 "... have be combined ..." should be -- ... have been combined ... --.

Signed and Sealed this

Fourth Day of January, 2000

Attest:

Attesting Officer

*Acting Commissioner of Patents and Trademarks*